(12) United States Patent
Howe et al.

(10) Patent No.: US 8,474,554 B2
(45) Date of Patent: Jul. 2, 2013

(54) FAST TRACKED GROUND VEHICLE

(75) Inventors: Michael David Howe, South Berwick, ME (US); Geoffrey Scott Howe, North Berwick, ME (US)

(73) Assignee: Howe and Howe Technologies, Inc., Waterboro, ME (US)

( * ) Notice: Subject to any disclaimer, the term of this patent is extended or adjusted under 35 U.S.C. 154(b) by 301 days.

(21) Appl. No.: 12/729,690

(22) Filed: Mar. 23, 2010

(65) Prior Publication Data

US 2010/0236844 A1 Sep. 23, 2010

Related U.S. Application Data

(60) Provisional application No. 61/162,875, filed on Mar. 24, 2009.

(51) Int. Cl.
*B62D 55/12* (2006.01)
(52) U.S. Cl.
USPC .......................................... 180/9.62; 305/112
(58) Field of Classification Search
USPC .................. 180/9.62, 9.1; 305/100, 101, 112, 305/116, 122, 157, 158, 165, 185, 40, 193, 305/24, 35
See application file for complete search history.

(56) References Cited

U.S. PATENT DOCUMENTS

| | | | | |
|---|---|---|---|---|
| 4,938,546 A | * | 7/1990 | Simmons | 305/180 |
| 4,991,911 A | * | 2/1991 | Blais | 305/168 |
| 5,354,124 A | * | 10/1994 | James | 305/162 |
| 5,435,405 A | * | 7/1995 | Schempf et al. | 180/9.1 |
| 7,901,015 B1 | * | 3/2011 | Anderson | 305/51 |

* cited by examiner

*Primary Examiner* — Tashiana Adams
(74) *Attorney, Agent, or Firm* — Pierce Atwood LLP; Joseph M. Maraia (57) ABSTRACT

An unmanned guided vehicle that is at least twice as fast as those of the prior art, lighter, less vulnerable, and more reliable than the prior art having at least one of: a dual-action dogleg suspension system; a track system comprising a plurality of cleats, a rubber insert secured to each cleat, and two cables serially joining each cleat to make up a track; a track guide system comprising a shark fin secured to each cleat that runs through a plurality of track guides; a dry clutch and braking system; a tubular chassis comprising a tubular center chassis and a tubular suspension chassis; a spring-loaded piston track tension compensator system; a flat drive tooth drive sprocket system that allows for clearing foreign debris from between the teeth; and a suspension carrier modular design assembly system comprising a passenger side suspension carrier, center cage, and driver's side suspension carrier.

20 Claims, 11 Drawing Sheets

FAST TRACKED GROUND VEHICLE

BACKGROUND

1. Field of the Invention

The invention relates to tracked land vehicles, particularly unmanned tracked ground vehicles.

2. Description of the Related Art

Unmanned vehicle technology is an extremely important key to possessing a viable, cost effective and life conscientious future fighting force. While, unmanned aerial vehicles have found success in Iraq and Afghanistan, full size unmanned ground vehicles ("UGVs") have yet to be deployed. With a large percent of war casualties resulting from ground combat and improvised explosive devices ("IEDs"), it is imperative that the armed services strive to employ UGV technology as soon as possible.

Several full size UGVs have been attempted, including the USMC's "Gladiator," DARPA/ARMY/Carnegie Mellon's "Crusher," and Lockheed Martin's "Mule." However, each of them has shortcomings. They will be discussed in turn below using publicly available information.

Gladiator. In 2005, Carnegie Mellon and United Defense Industries were awarded a contract for the development and demonstration of the USMC Gladiator. As a tracked vehicle, the Gladiator is a robust UGV with little to no suspension, a top speed of approximately 10 mph and weight of approximately 10,000 lbs. Much of the Gladiator's performance characteristics are not published but may be surmised through observation. The origin of the chassis is also not public information but closely resembles what is known in the construction industry as a "Skid Steer." These are slow moving bucket loaders with stationary idler suspension wheels and rubbers tracks coupled to a hydraulic motor planetary gear drive system. These vehicles are built with a solid plate steel chassis making quick and efficient servicing difficult. While highly maneuverable at low speeds most Skid Steers possess no suspension and struggle to break 10 mph. Power train and valve upgrades are commercially available, however are not recommended due to the Skid Steer's inherent instability at mid-high speeds and lack of suspension. While durable, the Gladiator's off-road performance is very limited and may be vulnerable to attack due to its lack of speed. Furthermore, the Gladiator's modularity and serviceability are also limited due to its welded steel plate chassis design. Gladiator weapons systems include but may not limited to a remote turret capable or firing the 7.62 mm gun.

Crusher. Unveiled in 2006 by DARPA/ARMY and Carnegie Mellon, the Crusher is a 6 wheeled, 14,000 lb UGV possessing a research and development price tag of $35 million. With a top speed of 26 mph and a suspension travel of 30 inches, Crusher offers fair mid-speed performance characteristics and obstacle suppression. The chassis comprises of aluminum tubes, titanium substructures, steel plating and was developed ground up for UGV operation. Again, many of the vehicles design and performance characteristics are not public information, but can be surmised through observations of online videos and graphics. It is clear through the videos that Crushers has a capable off-road chassis, especially when considering its weight, although its drive train complexity is clear and comes into question. The Crusher possesses six different electric drive motors coupled with six different planetary gears for each wheel. With no front steering and all six wheels locked in the same plane, Crusher must turn using differential wheel speed. Thus, Crusher must also possess complex drive software and electrical control matrixes. For these reasons, Crusher's productivity, complexity and serviceability are clear weaknesses. Furthermore, possessing six different planetary drive hubs increases the UGVs vulnerability to IEDs and firearms attacks. How will the Crusher perform with one or two of its drive motors or hubs disabled, which can be accomplished by a simple software failure of a well-placed bullet?

Finally, six wheels certainly are an advantage over four wheels in off-road terrain, but still do not compare to tracks. Much of the footage in Crusher's videos is captured on hard terrain. How will the Crusher compare on softer substrate such as swamp, deep mud, or loose sand?

Mule. At approximately 5,000 lbs, the Mule resembles a smaller version of the Crusher and is developed in part by the U.S. Army and Lockheed Martin. It possesses many of the performance characteristics of the Crusher, yet has an active electro-controlled suspension leveling system. While adding a level of ride control, the active electro-controlled suspension leveling system also adds to the Mule's complexity, cost of production, lack of reliability, and combat vulnerability. The total cost of the Mule's research and development is not public but estimated to be in the tens of millions of dollars along with both the Crusher and the Gladiator. Both the Mule and the Crusher are outfitted with a turret system designed to accommodate a 7.62 mm gun, 50 caliber gun, and Javelin missiles.

In view of the foregoing, what is needed is UGV that is at least twice as fast as those of the prior art, lighter, less vulnerable, and more reliable.

SUMMARY

An unmanned guided vehicle that is at least twice as fast as those of the prior art, lighter, less vulnerable, and more reliable than the prior art having at least one of: a dual-action dogleg suspension system; a track system comprising a plurality of cleats, a rubber insert secured to each cleat, and two cables serially joining each cleat to make up a track; a track guide system comprising a shark fin secured to each cleat that runs through a plurality of track guides; a dry clutch and braking system; a tubular chassis assembly comprising a tubular center chassis and a tubular suspension chassis; a spring-loaded piston track tension compensator system; a flat drive tooth drive sprocket system that allows for clearing foreign debris from between the teeth; and a suspension carrier modular design assembly system comprising a passenger side suspension carrier, center cage, and driver's side suspension carrier. These and other features, aspects, and advantages of the present invention will become better understood with regard to the following drawings, description, and claims.

TABLE OF REFERENCES

| Item | Name |
|---|---|
| 100 | Dual action dogleg assembly |
| 102 | Dogleg |
| 104 | Dogleg top |
| 106 | Torsion bar |
| 108 | Dogleg bottom |
| 110 | Hinge |
| 112 | Bogie beam |
| 114 | Road wheels |
| 116 | Pneumatic shock mount |
| 200 | Track assembly |
| 202 | Cable |
| 204 | Cleat assembly |
| 206 | Rubber insert |
| 208 | U-shaped piece |
| 210 | Anti-rumblers |
| 212 | Shark fins |
| 214 | Cable holes |
| 216 | Crimps |
| 300 | Track guide assembly |
| 302 | Track guides |
| 400 | Final drive clutch system |
| 402 | Rotor to axle spline adapter |
| 404 | Clutch rotor |
| 406 | High pressure hydraulic rotary valve |
| 408 | Clutch dual piston caliper |
| 410 | Clutch to hub mount plate |
| 412 | Drive hub |
| 414 | Flat faced drive sprocket |
| 416 | Brake rotor |
| 418 | Brake calipers |
| 500 | Tubular chassis assembly |
| 502 | Tubular center chassis |
| 504 | Tubular suspension chassis |
| 600 | Spring-loaded piston track tension compensator assembly |
| 602 | Front take-up inner tube |
| 604 | Front take-up outer tube |
| 606 | Spring |
| 608 | Front take-up sprocket |
| 700 | Flat drive tooth drive sprocket assembly |
| 702 | Foreign debris avenues |
| 704 | Flat tooth drive |
| 800 | Suspension carrier modular design assembly |
| 802 | Passenger side suspension carrier |
| 804 | Center cage |
| 806 | Driver side suspension carrier |

DESCRIPTION

Dual Acting Dogleg

Figure 1:
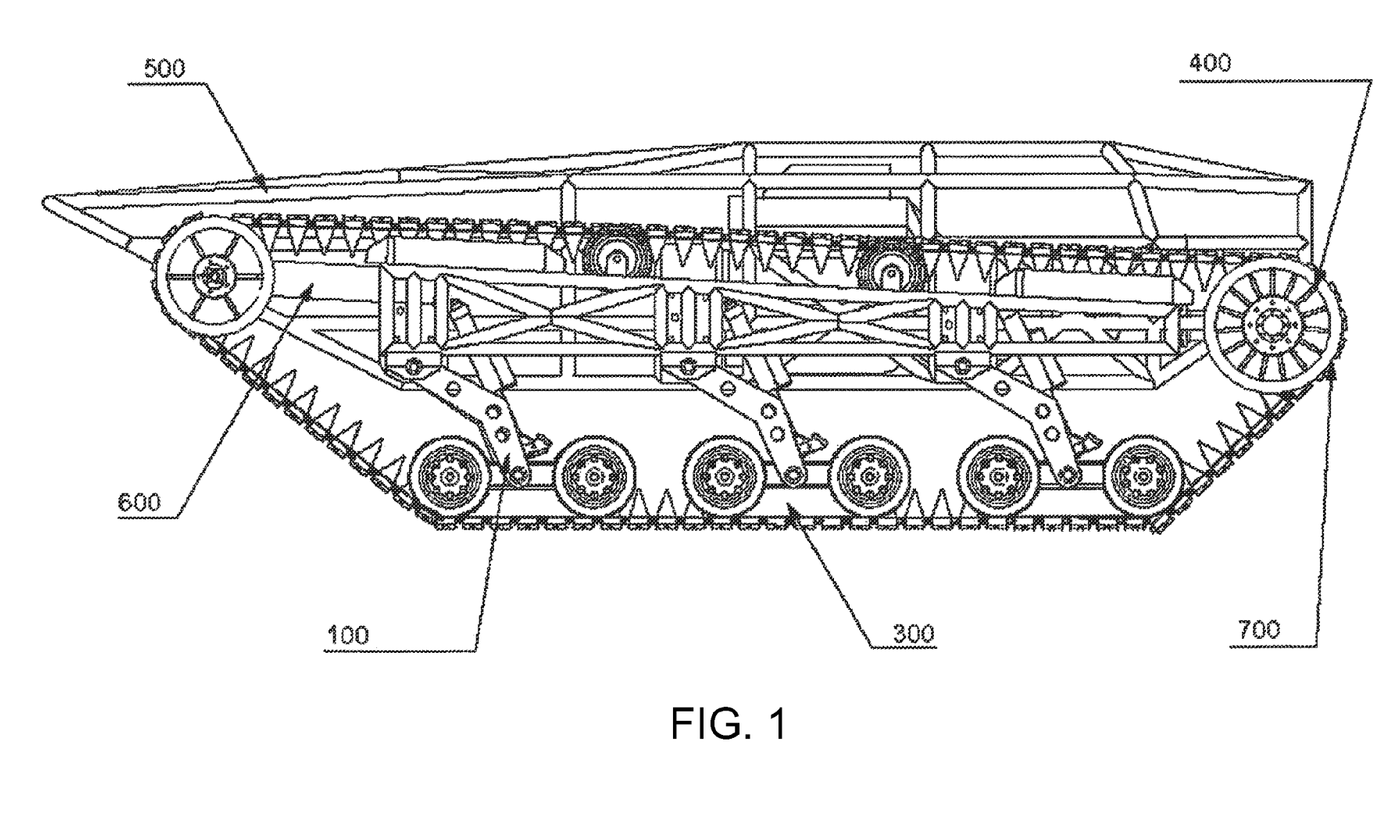
FIG. 1 is a side elevation of a UGV according to the present invention.
Figure 2:
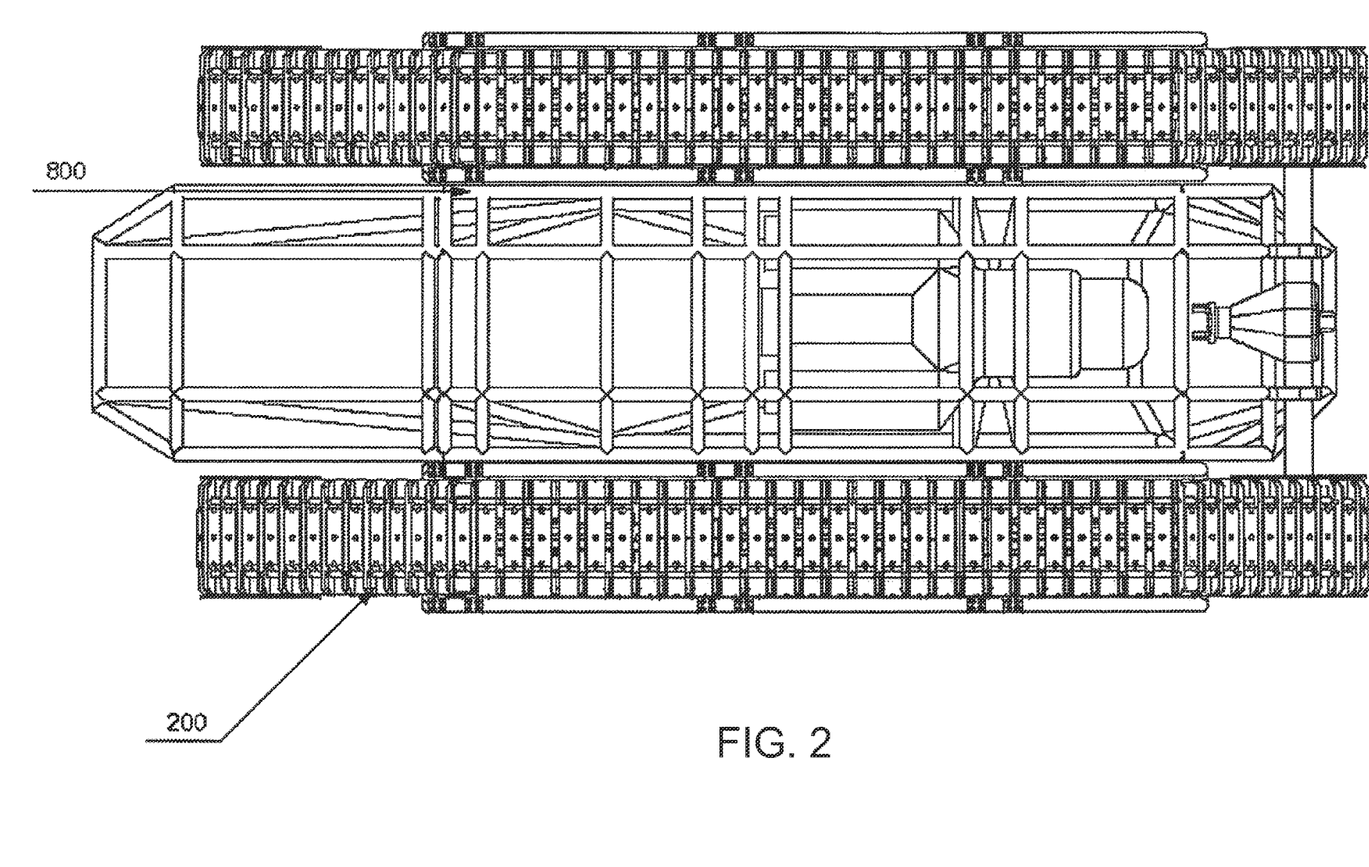
FIG. 2 is a bottom plan view of the UGV of FIG. 1.
Figure 3:
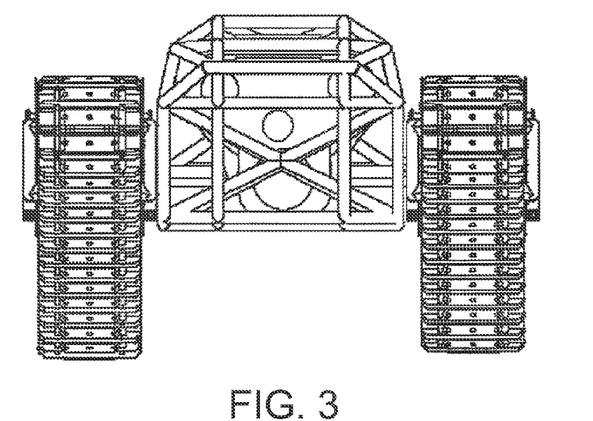
FIG. 3 is a front elevation of the UGV of FIG. 1.
Figure 3A:
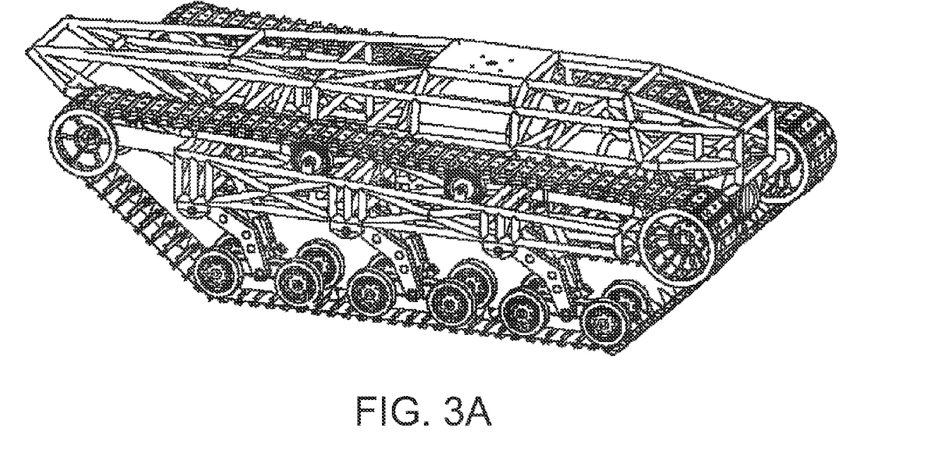
FIG. 3A is an orthogonal view of the UGV of FIG. 1.
Figure 4:
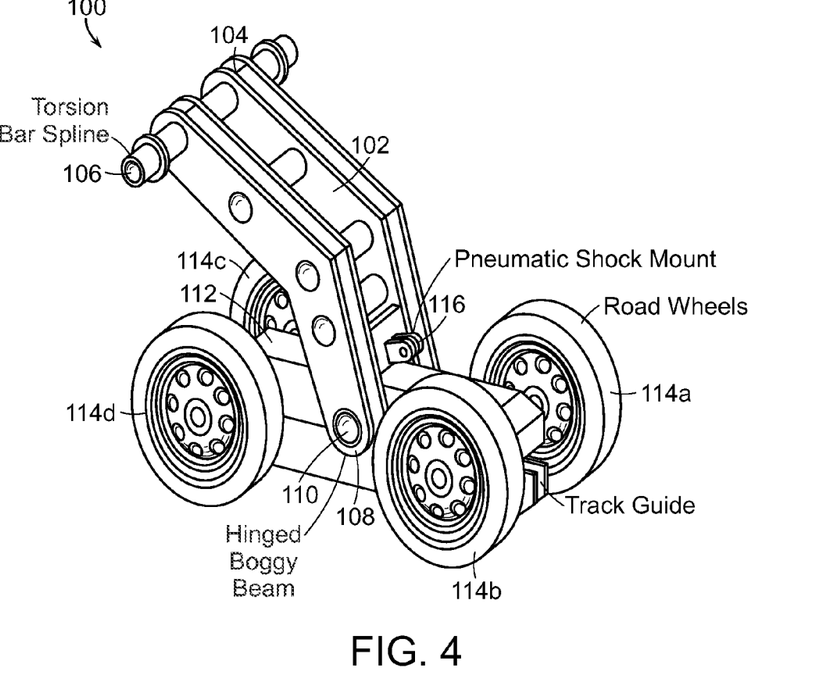
FIG. 4 is an orthogonal view of the dual-action dogleg suspension system.
Figure 5:
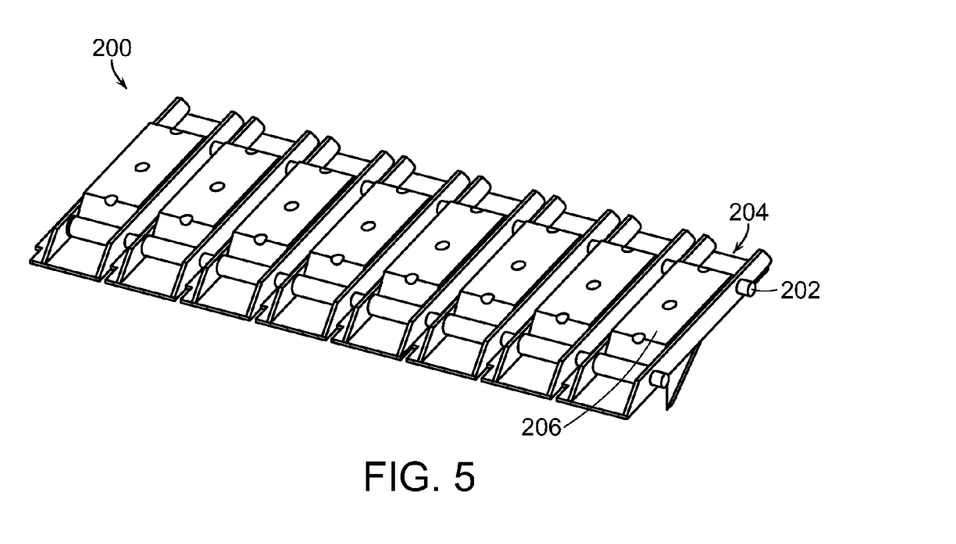
FIG. 5 is an orthogonal view of the track design assembly according to the present invention.
Figure 6:
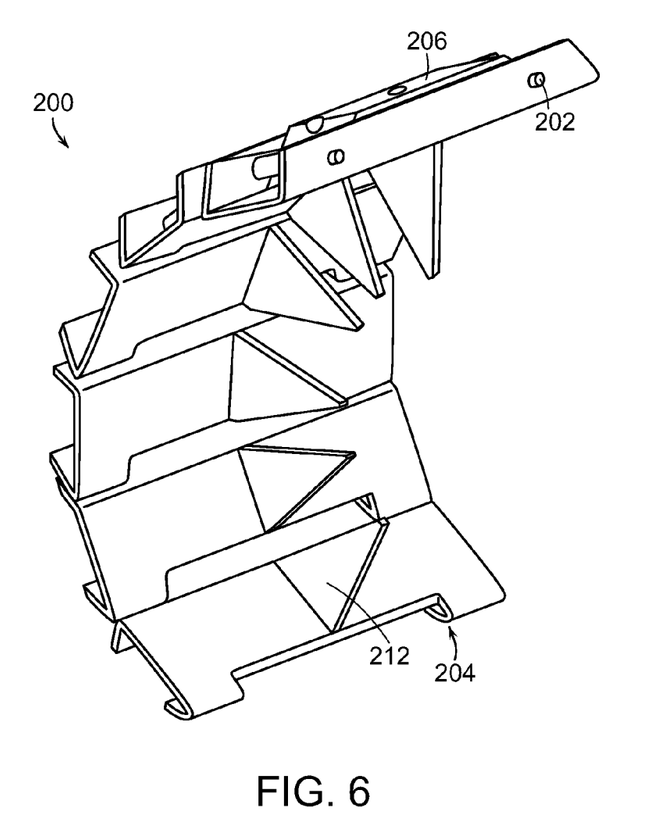
FIG. 6 is a different orthogonal view of the track design assembly of FIG. 5.
Figures 7, 8:
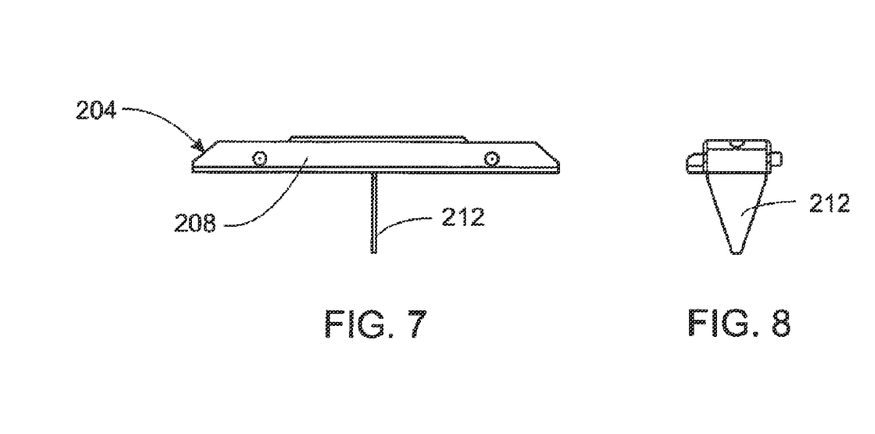
FIG. 7 is a side elevation of a cleat assembly according to the present invention.
FIG. 8 is a front elevation of the cleat assembly of FIG. 7.
Figure 9:
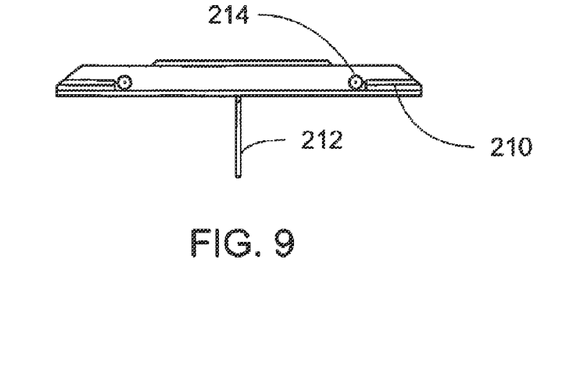
FIG. 9 is a side elevation of the cleat assembly of FIG. 7 showing the side opposite side as that shown in FIG. 7.
Figure 10:
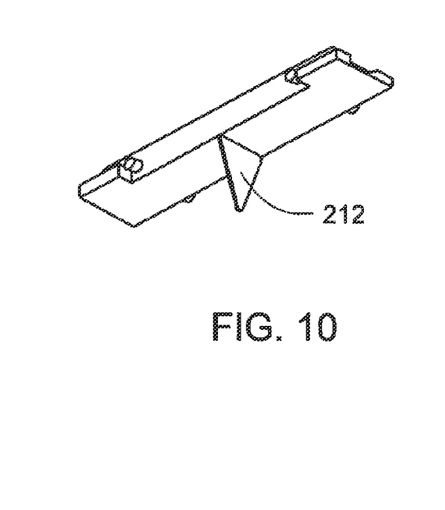
FIG. 10 is an orthogonal view of the cleat assembly of FIG. 7.
Figure 11:
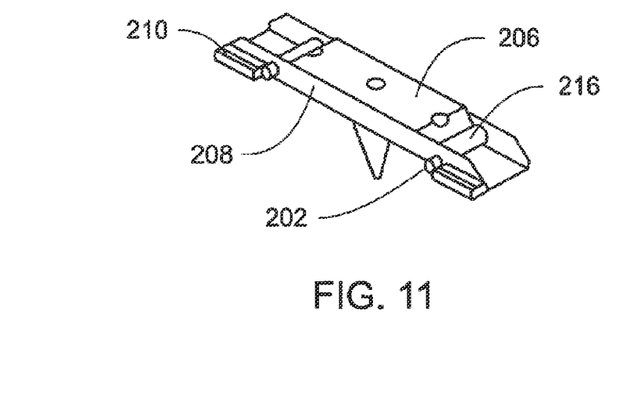
FIG. 11 is a different orthogonal view of the cleat assembly of FIG. 7.

Turning to FIG. 4, a dual acting dogleg assembly 100 has a swept suspension dogleg 102 that is hinged at the top 104 where it is splined to a torsion bar 106 that travels through the Z plane. This leg 102 typically acts at a swept back 45 degrees and travels to −10 degrees compressed. At the bottom 108 of the dogleg 102 there is another hinge 110 that connects the bogie beam 112. The bogie beam 112 houses the road wheels 114*a*, 114*b*, 114*c*, 114*d*, and hinges freely around the bottom 108 of the dogleg 102. Essentially, the road wheels 114*a*-114*d* are allowed to pivot around the bogie beam center 110 while the dogleg 102 is allowed to travel around the torsion bar 106 axis. The dogleg axial twist rate is also influenced by pneumatic shocks, not shown here. The pneumatic shocks have a mount 116 on the dogleg 102.

Track Design

Turning to FIGS. 5-11, the track assembly 200 is a compilation of three parts: at least one cable 202, cleats 204, and rubber inserts 206. The cables and cleats are made of steel in one embodiment. There are preferably two cables 202.

Two lengths of cable 202 are stretched in parallel where in one embodiment 97 cleats 204 are crimped permanently to the cables 202. Rubber inserts 206 then fill a portion of the inner track and act as a wearing surface.

The cleats 204 are made of several pieces of material that each serve different purposes. The main body of the cleat is a rectangular "U" shaped piece 208 in which the cable 202 runs through at a perpendicular relationship. The rubber inserts 206 preferably extend beyond the ends of the "U".

Welded to the main body are "anti-rumblers" 210. These are small pieces of square tubing on each end and one side that act to bridge the one-inch gap between each cleat 204. There are at least one anti-rumblers per cleat secured to the main body parallel to the axis of the U. Triangular pieces of steel known as "shark fins" 212 are secured to the bottom of the main cleat body 208 perpendicular to the axis of the U and serves to center the track as is travels through the suspension and around the suspension carrier. The main cleat body 208 also has a cross of flat material secured in the center to add rigidity. The cleat 204 has holes 214 perpendicular to the axis of the U where the cables 202 are crimped in place. Tubes having a length substantially spanning the U are preferably welded in coaxially to these holes 214, perpendicular to the axis of the U, and act as permanent crimps 216 to the cable 202. The tubes have an ID at least as large as the OD of the cable, and are sized to accept the cable, and then the tubes are secured to the cable preferably by crimping. Finally, each end of the track possesses steel hinges that link each end.

Track Guide System

Figure 12:
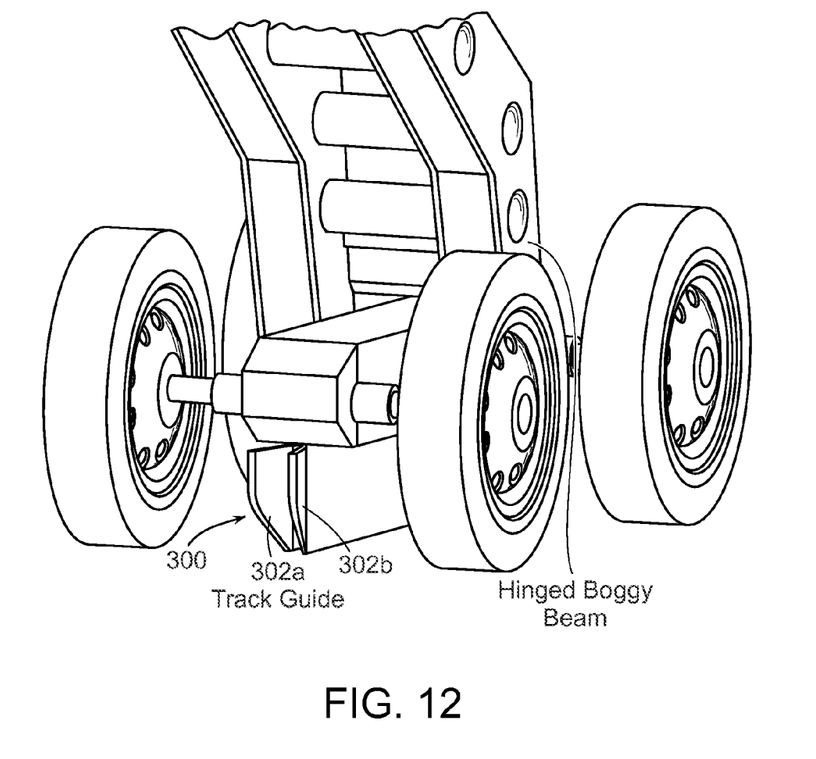
FIG. 12 is an orthogonal view of a track guide assembly according to the present invention.
Figure 13:
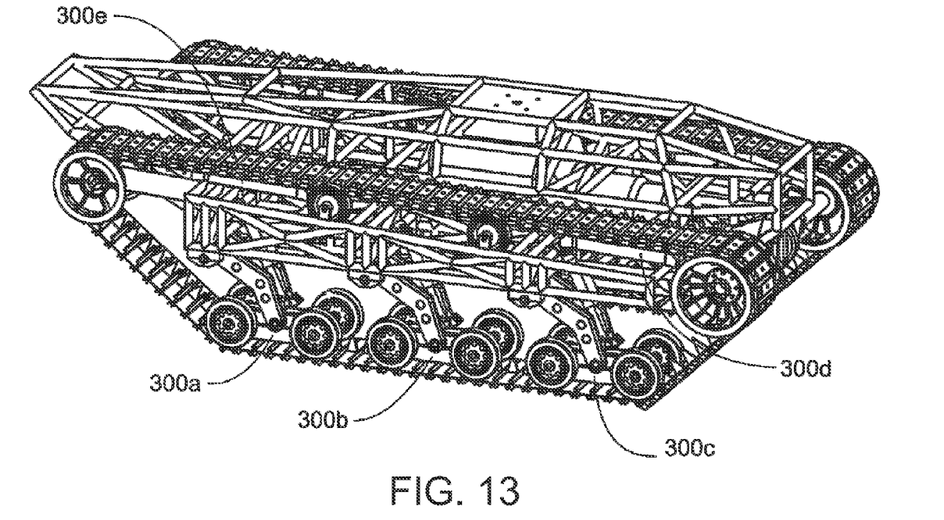
FIG. 13 is an orthogonal view of one embodiment of the UGV of the present invention showing the location of the track guide assemblies.

As the world's fastest tracked vehicle it is necessary that the UGV of the present invention possess a unique track guide assembly 300. Turning to FIGS. 12-13, the UGV's track shark fins 212 are guided through track guides 302*a*, 302*b*, made of plate material, at five different points. These plates are substantially parallel and separated by approximately 0.375 inches. The plates can be angled slightly outward. They are positioned under each bogie beam 112 and to the front and rear on top of the suspension carrier. Much like a chain saw, the track's shark fins 212 occupy the space between the steel guides 302*a*, 302*b*, making it extremely difficult for UGV of the present invention to throw a track.

Final Drive Clutch System

Figure 14:
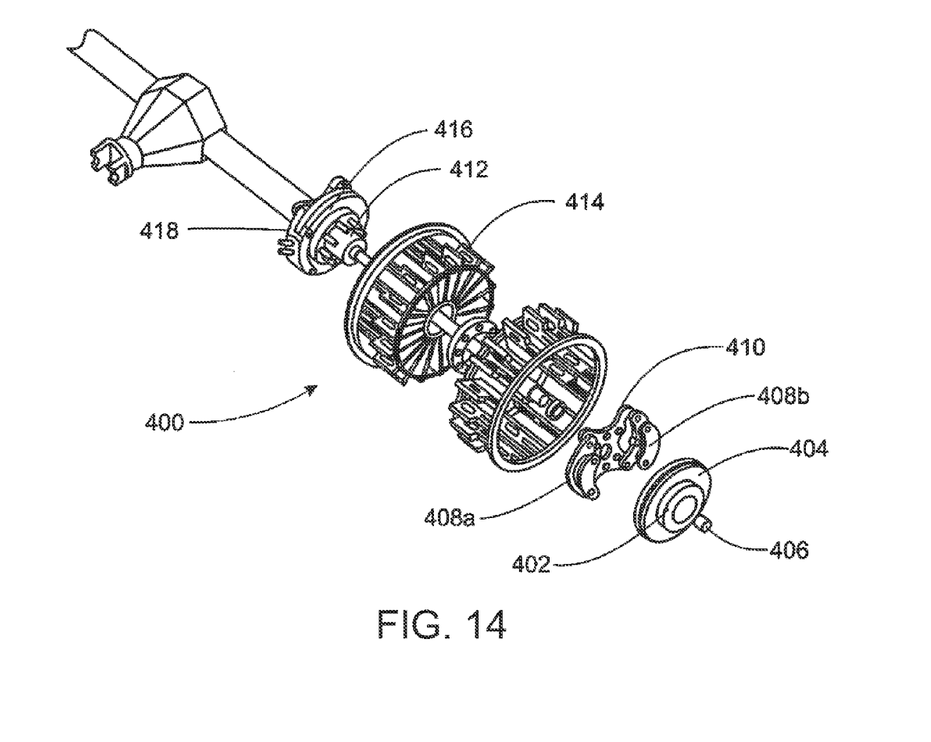
FIG. 14 is an exploded view of the final drive clutch system according to the present invention.

The final drive clutch system 400 shown in FIG. 14 is a very durable drive system that allows for the engagement and disengagement of over 14,000 ft/lbs of rotor force in a 14-inch diameter dry disk system. The force can also be clutched to vary the actual output load and rpm. Essentially, a closed differential ring and pinion gear set apply rotor force to the outside "top hat" also known as the rotor to axle spline adapter 402. This in turn applies rotary force to the clutch rotor 404. Hydraulic pressure can then be supplied through the high-pressure rotary valve 406 to actuate the clutch dual piston calipers 408a, 408b that in turn applied friction to the clutch rotor. As friction builds, the rotary force of the clutch rotor is transmitted to the clutch hub mount plate 410 that is secured to the main drive hub 412 preferably by bolting. Thus, force is transmitted through the hub 412 and flat faced drive sprocket 414 and finally to the track. The drive hub 412 also possesses a fixed inner brake rotor 416, allowing for the hub 412 to be braked conventionally.

Both the drive clutch calipers 408a, 408b and brake calipers 418 can be pressured independently to achieve both clutched and braked rotor force simultaneously. The complete system is dry and does not use oil or lubricates to reduce heat and/or augment coefficients of friction. The system is also very durable and resistant to dirt and/or foreign debris. The clutch is very small and able to be housed in the outer hub while still being able to clutch over 14,000 ft/lbs.

Tubular Tracked Vehicle Chassis

Figure 15:
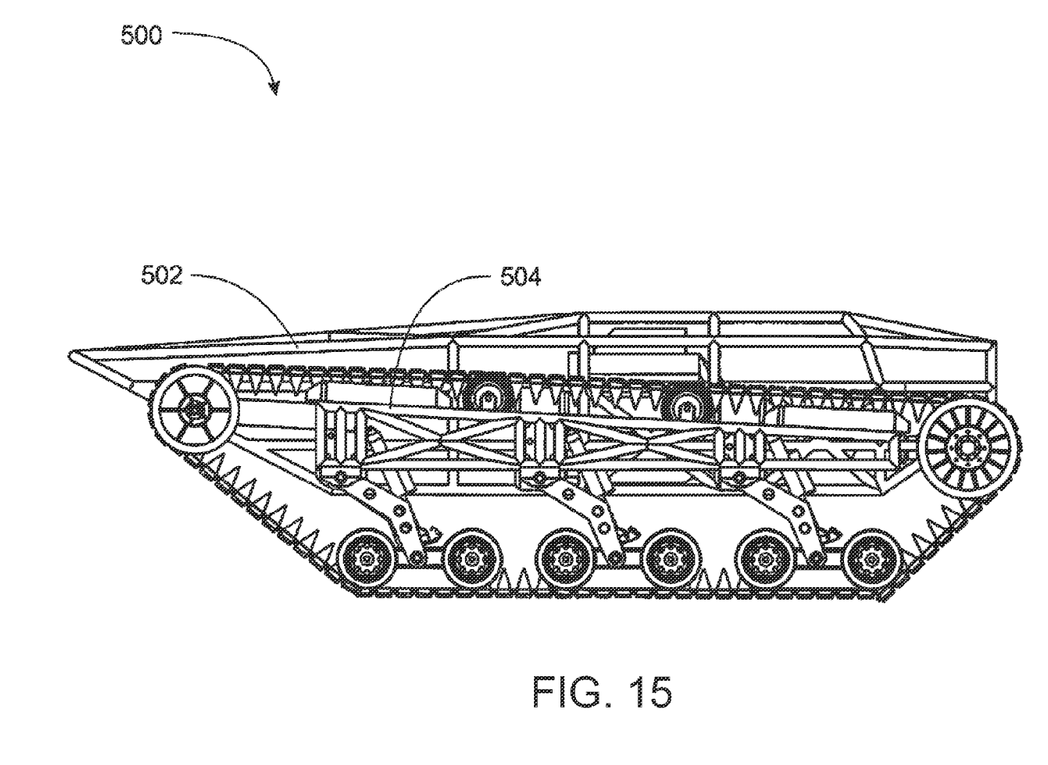
FIG. 15 is a side elevation of the present invention showing the tubular chassis assembly.

In order to improve weight and strength, the UGV of the present invention possesses a tubular chassis assembly 500 in FIG. 15 much like the chassis found in NASCAR. Essentially, by using 4130 chrome molly steel tubing Ripsaw possesses an exo-skeleton much lighter and stronger than conventional tracked vehicle chassis. The chassis assembly 500 is made up of a tubular center chassis 502 and a tubular suspension chassis 504.

Spring-Loaded Piston Track Tension Compensator

Figure 16:
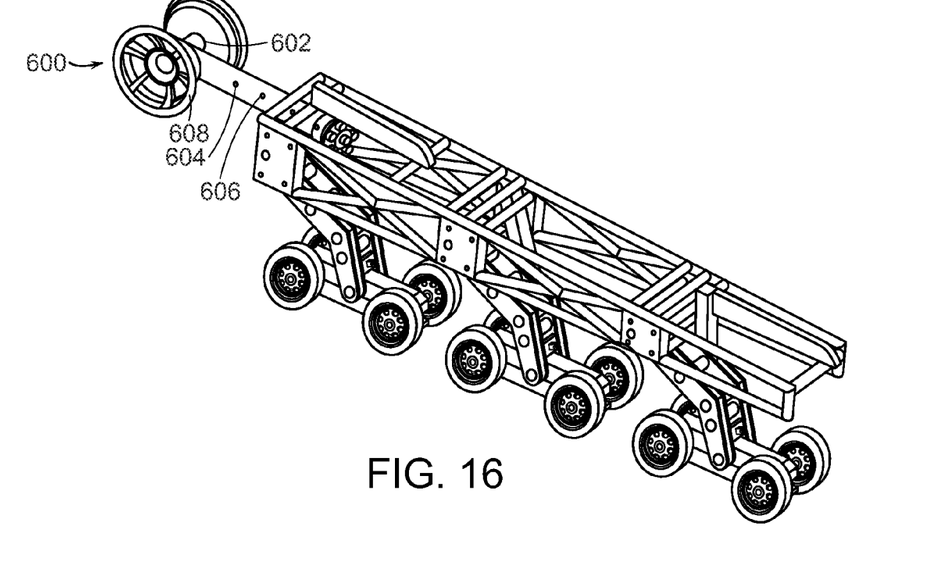
FIG. 16 is an orthogonal view of a spring-loaded piston track tension compensator assembly according to the present invention.

Turning to FIG. 16, as the suspension is compressed, the linear track path becomes shorter. Essentially, the track may become loose as the doglegs become swept back under full compression if it had no compensation. For this reason, it is essential that the UGV of the present invention possess a self adjusting track tensioner assembly 600, which comes in the form of the "front take up" shown in FIG. 16. A spring-loaded inside tube 602 and an outside tube 604 are assembled with a spring 606 inside the inside tube 602 that is secured parallel to the track. A front take-up sprocket 603 secured to the outside tube 604. Therefore, the assembly 600 always keeps a certain amount of pressure or tensile force upon the track. This force will keep the track firmly seated within its guides as the suspension is a allowed to travel and the track path length varies. Most conventional tracked vehicles use a cam-operated tensioner that is not self-adjusting and locked into place during operation. Other tanked vehicles may use a linear grease piston set on rail system to adjust track tension, yet once again these adjustments are made while vehicle is not in operation and designed to be locked in position while moving. The linear spring loaded piston found in the present invention never needs to be manually adjusted, allowing for an astounding 16-inch of suspension travel, a mark previously unheard of in tracked vehicles.

Flat Drive Tooth Drive Sprocket

Figure 17:
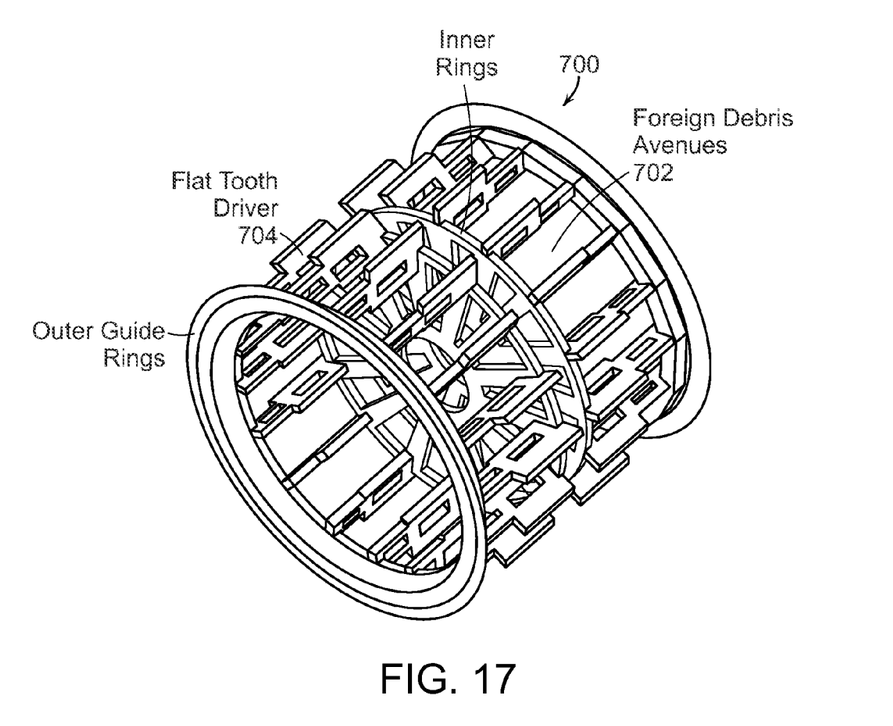
FIG. 17 is an orthogonal view of a flat drive tooth drive sprocket assembly according to the present invention.

Due to the unique track design, the flat drive tooth drive sprocket assembly 700 uses a flat sprocket tooth design to engage the track, as shown in FIG. 17. This allows ease for track manufacturing and the cable track design. The flat tooth drives 704 are substantially planar pieces oriented radially. A pair of outer ring guides is secured to the flat tooth drives. Together, they are adapted to engage the track system. The outer ring guides and flat tooth drives define avenues 702 throughout the circumference of the rings to allow for the clearing of foreign debris between the flat tooth drives 704.

Suspension Carrier Modular Design

Figure 18:
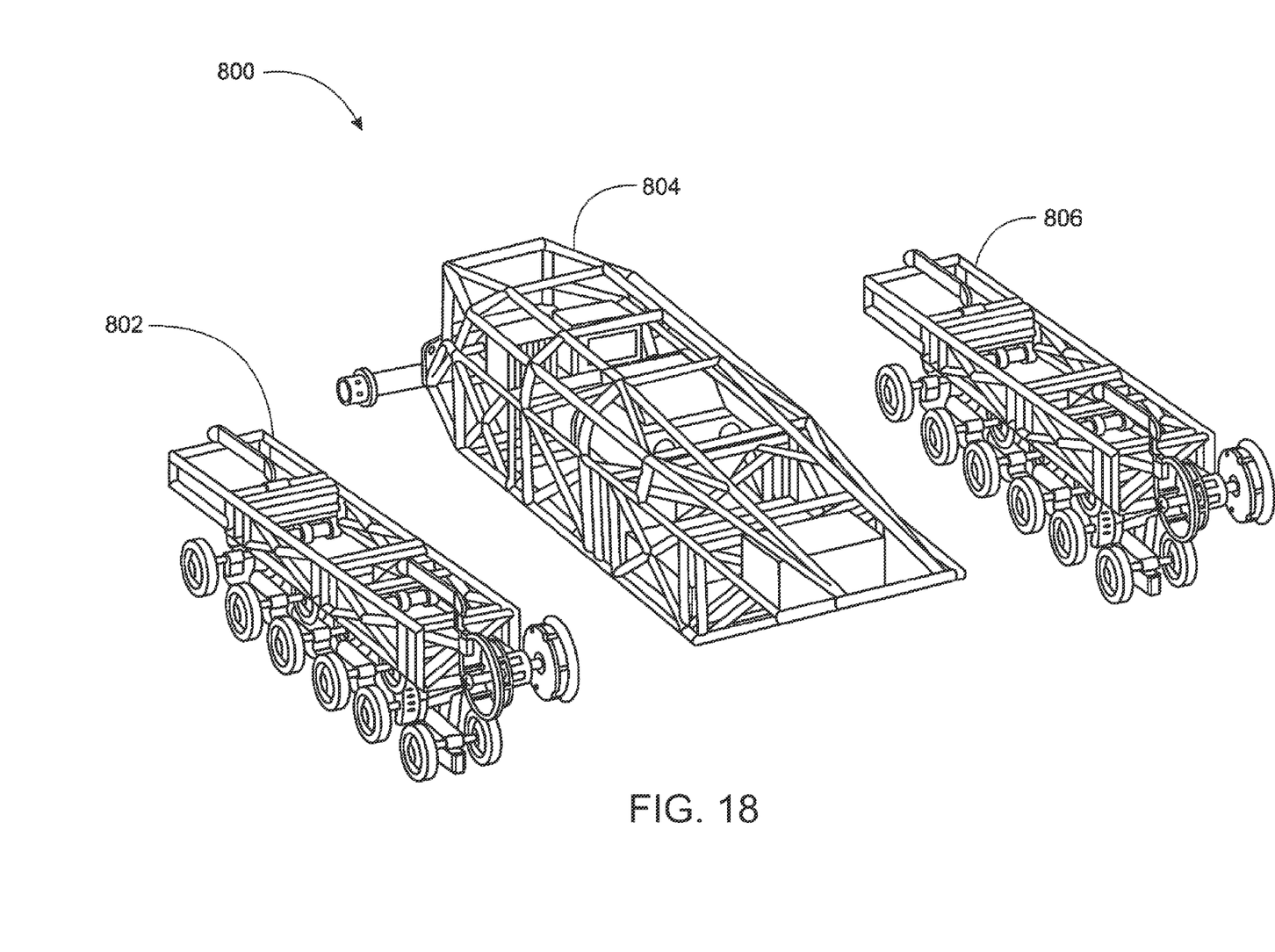
FIG. 18 is an orthogonal view of a suspension carrier modular design assembly according to the present invention.

FIG. 18 shows the suspension carrier modular design assembly 800. One of the challenges in developing a military type vehicle is making it easily repairable. In order to do so the vehicle must be modular by design. The larger issue lies in the fact that tubular designed vehicles are intrinsically not modular. Nevertheless, the present invention is not only a modular tracked vehicle but also a modular tubular tracked vehicle. The assembly consists of three main body parts: the passenger side suspension carrier 802, the center cage 804, and the driver's side suspension carrier 806. Each suspension carrier 802, 806 houses all of the suspension components for one side, while the center cage 804 houses the engine, drive train, and vehicle computers. Twelve bolts or fewer hold each suspension carrier 802, 806 on with reinforcing gussets that support mount plate in both the center cage 804 and suspension carrier. Essentially, one whole side of the UGV of the present invention can be replaced in a short amount of time. Conventional tracked vehicles are able to replace one suspension piece at a time because each piece is mated to the main frame and not a sub-frame, or in the case of the present invention, a suspension carrier. Furthermore, the suspension of the present invention is also modular within the suspension carrier itself.

Altogether, the improvements of the present invention give many advantages over the prior art. At 6500 lbs with a top speed of 65 mph and an acceleration of 0-50 mph in 5 seconds, the present invention's performance characteristics are currently unmatched by any other military ground vehicle. This platform has been tested as a UGV via virtual remote control technology (VRCT) and has exceeded all performance characteristic expectations. Furthermore, the present invention was the first full-size vehicular platform developed solely for remote control operation. This allows for unique chassis design and superior performance over manually driven vehicles that are simply retrofitted for UGV operation. The present invention is the only fully custom, tube frame, tracked vehicle in the world, owning top speed, acceleration and light weight records in manned and unmanned tracked vehicle categories. In addition, it was designed in three modular pieces to allow for ease of maintenance and repair. When considering its acceleration, top speed, climb rate of 45 degrees, power to weight ratio, agility, and ground clearance, the UGV of the present invention is one of the most capable off-road vehicle ever produced and is truly in a league of its own.

Some of the advantages of the present invention are as follows:

1. Cost. A production unit is expected to cost approximately $350 k-$450 k, which is far less than those of the prior art.

2. Productivity. The present invention was designed to incorporate existing commercial vehicle parts and possesses very few uniquely machined pieces.

3. Serviceability. Similar to the M1A Abrams modularity, the UGV of the present invention is designed as three modular entities, bolted together to establish a rugged light weight chassis while making its serviceability and maintenance simple and fast.

4. Durability. The UGV of the present invention has been tested and proven under extreme conditions and has shown to be ultra-reliable and durable. Built with the preferred 4130 chrome molybdenum tubing, its chassis resembles a NASCAR chassis, where durability under punishing environments is standard and expected as everyday operation. Furthermore, the present invention also possesses a drive transmission that has been proven for over thirty years and can be found in 90 percent of all school buses. It is a transmission designed to "stop and go" an average weight of 20,000 lbs while carrying the most precious of cargo.

5. Speed. The present invention is the fastest dual-tracked vehicle ever produced with a top speed of over 80 mph. The UGV of the present invention, with the added weight of being military specified, will achieve 55-65 mph and a blistering acceleration of 0-50 mph in 5 seconds. It will be the fastest accelerating weapons ground platform ever produced. A statistic essential when avoiding incoming weapons fire or responding to a hot zone.

6. Suspension. Using six dual-acting dogleg torsion arms, the present invention possesses 20 inches of suspension travel and superior off-road obstacle suppression. All suspension pieces are passively acting and extreme durable, lending to a simple, reliable and very rugged design. Each torsion bar may be quickly adjusted for varied ride height, suspension stiffness and increased ground clearance. Furthermore, the entire suspension system and chassis have been designed to endure 48,000 lbs of vertical impact force, allowing it to withstand a static drop height of ten feet. The present invention has one of the smoothest riding chassis, which in turn allows for a more accurate remote weapons system.

7. Simplicity. The UGV of the present invention was designed from the ground up to be simple and rugged with reliability being one of the main considerations. The engine, transmission, and drive train were carefully selected and are primarily operated through mechanical means with little computer interfacing. Furthermore, the suspension is passive and requires no computer interfacing or control.

8. Tracks. The tracks of the present invention are lightweight and inexpensive to produce. Other track designs remain heavy and expensive.

The many novel features present in this invention. In fact, this invention was selected by Popular Science magazine for an "Invention Award" in 2009. See http://www.popsci.com/military-aviation-amp-space/article/2009-05/fastest-tank. Popular Science has been a leading source of science and technology news since its inception in 1872.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A fast tracked ground vehicle comprising at least one selected from the group consisting of:
   a dual-action dogleg suspension system;
   a track system comprising a plurality of cleats, a rubber insert secured to each cleat, and at least one cable serially joining each cleat to make up a track;
   a track guide system comprising a shark fin secured to each cleat that runs through a plurality of track guides;
   a dry clutch and braking system;
   a chassis assembly comprising a tubular center chassis and a tubular suspension chassis;
   a spring-loaded piston track tension compensator system;
   a flat drive tooth drive sprocket system that allows for clearing foreign debris from between the teeth; and
   a suspension carrier modular design assembly system comprising a passenger side suspension carrier, center cage, and driver's side suspension carrier.

2. The vehicle of claim 1, the dual-action dogleg suspension system comprising:
   a dogleg having a dogleg top and a dogleg bottom opposite the top; the dogleg being hinged at the dogleg top to a torsion bar in communication with the chassis assembly;
   a bogie beam hinged to the dogleg at the dogleg bottom; and
   four road wheels pivotally secured to around a center of the bogie beam.

3. The vehicle of claim 1, the cleat comprising:
   a rectangular U-shaped main body; and
   at least one square tubing anti-rumbler that is smaller than the main body secured parallel to the axis of the main body U.

4. The vehicle of claim 3, the cleat further comprising a triangular shark fin secured to a bottom of the main cleat body perpendicular to the axis of the U.

5. The vehicle of claim 3, the main body further comprising a tube having a length substantially spanning the U having an ID at least as large as the OD of the cable, adapted to accept a cable.

6. The vehicle of claim 5, wherein a cable is secured to a cleat by crimping a tube.

7. The vehicle of claim 1, the track guides comprising a pair of substantially parallel plates separated by approximately 0.375 inches for accepting shark fins therebetween.

8. The vehicle of claim 7 comprising five track guides per track.

9. The vehicle of claim 2, the track guides comprising a pair of substantially parallel plates secured to the bogie beam, the parallel plates being separated by approximately 0.375 inches for accepting shark fins therebetween.

10. The vehicle of claim 1, the dry clutch and braking system comprising:
    a rotor to axle spline adapter;
    a clutch rotor;
    a rotary valve; and
    a dual piston caliper, whereby a closed differential ring and pinion apply rotor force to the outside of the rotor to axle spline adapter, which in turn applies force to the clutch rotor, and hydraulic pressure can be supplied through the rotary valve to actuate the clutch dual piston caliper that applies friction to the clutch rotor.

11. The vehicle of claim 10, the dry clutch and braking system further comprising:
    a clutch hub mount plate; secured to
    a main drive hub; and
    a flat faced drive sprocket, whereby as friction to the clutch rotor builds, the rotary force of the clutch rotor is transmitted to the clutch hub mount plate secured to the main drive hub thereby transmitting force through the hub and sprocket which is in communication with the track system.

12. The vehicle of claim 11, further comprising an inner brake rotor for allowing the main drive hub to be braked conventionally.

13. The vehicle of claim 11, the flat faced drive sprocket comprising:
    a plurality of radially oriented flat tooth drives; and
    a pair of outer ring guides secured to the flat tooth guides, defining avenues between the flat tooth drives and outer ring guides for allowing the clearing of foreign debris between the flat tooth drives during vehicle operation.

14. The vehicle of claim 1, wherein the tubular chassis assembly is made of 4130 steel tubing.

15. The vehicle of claim 1, the spring-loaded piston track tension compensator system comprising:
    an inside tube; assembled to
    an outside tube;

a spring disposed within the inside tube; and a front take-up sprocket secured to the outside tube, whereby force is maintained on the track system in communication with the front take-up sprocket.

16. The vehicle of claim 1, the center cage comprising:
an engine;
a drive train; and
vehicle computers.

17. The vehicle of claim 1 wherein each suspension carrier is secured to the center cage by 12 bolts or fewer.

18. A fast tracked ground vehicle comprising:
a dual-action dogleg suspension system;
a track system comprising a plurality of cleats, a rubber insert secured to each cleat, and at least one cable serially joining each cleat to make up a track;
a track guide system comprising a shark fin secured to each cleat that runs through a plurality of track guides;
a dry clutch and braking system; and
a chassis assembly comprising a tubular center chassis and a tubular suspension chassis.

19. The vehicle of claim 18 further comprising a spring-loaded piston track tension compensator system comprising:
an inside tube; assembled to
an outside tube;
a spring disposed within the inside tube; and
a front take-up sprocket secured to the outside tube, whereby force is maintained on the track system in communication with the front take-up sprocket.

20. The vehicle of claim 18, further comprising a flat drive tooth drive sprocket system comprising:
a plurality of radially oriented flat tooth drives; and
a pair of outer ring guides secured to the flat tooth guides, defining avenues between the flat tooth drives and outer ring guides for allowing the clearing of foreign debris between the flat tooth drives during vehicle operation.

* * * * *